United States Patent [19]

Friese

[11] 4,006,984
[45] Feb. 8, 1977

[54] METHOD AND APPARATUS FOR THE MANUFACTURE OF PRINTING PLATES

[75] Inventor: Ferdinand Friese, Walldorf, Germany

[73] Assignee: Hoechst Aktiengesellschaft, Frankfurt am Main, Germany

[22] Filed: Nov. 5, 1975

[21] Appl. No.: 629,107

[30] Foreign Application Priority Data
Nov. 8, 1974 Germany ................... 2452979

[52] U.S. Cl. .................... 355/11; 355/14; 355/73
[51] Int. Cl.² .......... G03G 15/00; G03G 13/00; G03B 27/60
[58] Field of Search ............ 355/3, 11, 14, 17, 73

[56] References Cited

UNITED STATES PATENTS

| | | | |
|---|---|---|---|
| 2,945,434 | 7/1960 | Eichler et al. | 355/14 X |
| 3,091,219 | 5/1963 | Crumrine et al. | 118/637 |
| 3,218,950 | 11/1965 | Liedl et al. | 355/106 X |
| 3,330,555 | 7/1967 | Shearer et al. | 271/30 |
| 3,580,674 | 5/1971 | Schunck | 355/73 X |
| 3,634,006 | 1/1972 | Hollwedel, Jr. | 355/14 X |

FOREIGN PATENTS OR APPLICATIONS

| | | |
|---|---|---|
| 1,597,858 | 9/1966 | Germany |
| 1,797,190 | 9/1967 | Germany |
| 2,160,439 | 12/1970 | Germany |
| 489,818 | 6/1970 | Switzerland |

*Primary Examiner*—George H. Miller, Jr.
*Attorney, Agent, or Firm*—Bacon & Thomas

[57] ABSTRACT

A method and apparatus for the manufacture of printing masters by electrophotographic means in which the unexposed printing masters are placed in the apparatus in a printing master holder and undergo electrostatic charging, image exposure, development, drying and discharging from the apparatus mechanically. The apparatus provides a charging device, a lighting device for indirect illumination of an original, an imaging device for projecting the image of the original in a preselected scale onto the printing master, and transportation, development, and drying means.

24 Claims, 8 Drawing Figures

METHOD AND APPARATUS FOR THE MANUFACTURE OF PRINTING PLATES

BACKGROUND OF THE INVENTION

1. Field of the Invention

The present invention relates to a method and an apparatus for the manufacture of printing masters by electrophotographic means, said apparatus comprising a charging means for charging the printing masters prior to exposure, a lighting means for illuminating the original, an imaging means for projecting the image of the original onto the charged printing form, and transportation, development, and drying means; said method comprising arranging an original in a holder, mechanically transferring the unexposed printing master by reduced pressure from a printing master holder to an exposure platform electrostatically charging the unexposed printing master, exposing the printing master to an image of the original projected through an imaging means by way of an illuminating means, mechanically transferring the exposed printing master to a developing station, developing and fixing the latent electrostatic image on the printing master, mechanically transferring the developed printing master to a drying station, drying the developed printing master, and mechanically discharging the finished printing master from the apparatus.

2. Description of the Prior Art

The liquid development of printing masters exposed to an image by emmersion, roller application, spraying, and/or passage through a developer bath, followed by drying by heat action, is known. As far as these process steps are manually performed, they involve the risk that the printing form is not always treated with the necessary uniformity, so that the final fixed image on the printing form may show irregularities.

The expression "printing master" as used in this specification shall also encompass printing plates and the like.

If any of the known apparatuses is used which allow a rapid and uniform operation, the light-sensitive layer carrying a latent electrostatic image corresponding to the optical image of the original is repeatedly contacted with the transportation means as it is conveyed from one treating station to the next, so that undesirable alterations in and destructions of the light-sensitive layer may occur, for example, by dust particles deposited on the means of transportation. Further, undesirable alterations, occurring, for example, when the charge of an electrophotographic printing master varies, may be caused by contact alone.

In one known attempt to eliminate these disadvantages, a developing device for printing masters has been proposed which comprises an obliquely arranged support on which the printing master is placed. The support is associated with a developer nozzle and a blast nozzle, and the support and the nozzles are so arranged that they can be moved relative to each other. This developing arrangement is only one of several stations used for the manufacture of electrophotographic printing masters, which, as far as the development process is concerned, yield faultless printing masters suitable for technical purposes, but do not influence the undesirable alterations in and destructions of the light-sensitive layer caused by the other process steps necessary in the production of the electrophotographic printing masters.

In another known device, which is associated with a copying apparatus, the image of an original is projected onto the printing master and the printing master is then converted into a printing surface from which copies may be printed in a conventional printing apparatus. The copying apparatus comprises an exposure and activating station including a developing unit in order to develop an ink-receptive image on the surface of the printing master. For this purpose, the printing master is exposed in the exposure station under an image of the original with which it is in contact, i.e., light is passed through the graphic original onto the light-sensitive printing master. The image of the original forms a shadow image in the corresponding areas of the printing master, thus discharging the printing master is a differentiated pattern and creating a latent, electrostatic image. The exposure device comprises, inter alia, a transparent cylinder surrounding a coaxially arranged light source. By conveying the printing master from one treating station to the next, the light-sensitive layer carrying the latent, electrostatic image of the original is constantly contacted with the transportation means, so that the above-mentioned undesirable alteration and destruction of the light-sensitive layer, for example, by dust particles deposited on the conveying system, may occur. Moreover, the exposure device of this known apparatus does not permit an edge-free illumination of the orignial, but the edges of the original are always reproduced on the printing master as fine shadow images.

Further, the known apparatuses have the drawback that they do not permit printing masters of varying sizes to be automatically fed without damaging or soiling them, and that it is impossible to light the printing masters without the formation of shadows or expose them in such a manner that the scale of reproduction is linearly changed in one direction.

SUMMARY OF THE INVENTION

Thus, it is a preferred object of the present invention to provide a method and an apparatus for the manufacture of electrophotographic printing masters of different sizes in which the individual printing master may automatically be removed from a supply, without the risk of damaging or soiling it, and exposed without the formation of shadows under an original at a fixed or variable scale of reproduction, so that, after development and drying, a technically unobjectionable electrophotographic printing master is obtained which is free from irregularities in the developed image.

According to the present invention, the advantageous objects are achieved by features whereby the printing masters stored preferably in the form of printing plates in a plateholder or magazine are individually removed by a carriage, preferably by reduced pressure, to a vacuum plate disposed preferably on the underside of the carriage; whereby the carriage is capable of displacement in the direction of an exposure platform where it deposits the picked-up printing master; whereby an original preferably clamped in a copyholder is illuminated by an illumination means having radiation sources screened from the original by a screen, in order to avoid direct illumination, and projected onto the printing master by means of an imaging means preferably a known movable optical system which allows a change of the scale of reproduction; and whereby transportation, developing, drying and discharge means enable the printing master to be completed mechanically within the apparatus. Preferably, the illumination means is a lighting device having first and second reflectors which partially surround the radiation sources and are arranged between a screen and the radiation sources in such a manner that they redirect the radiation received from the radiation sources onto the original by indirect reflection. Advantageously, each radiation source is surrounded by a first, curved reflector which is arranged at a distance of not more than 3 centimeters from the surface of the radiation source and is open in the direction of the longitudinal side walls of the lighting device.

In a further embodiment of the invention, the planar sections of the second reflectors are attached to the side walls of the lighting device and their curved sections extend in the direction of the radiation sources.

Preferably, the side walls of the lighting device are reflecting, so that they direct the incident radiation onto the original arranged in the copyholder at an acute angle to the surface of the original.

The indirect lighting of the original produces the following advantages:

The lighting device may be made of a more compact structure, although the path of rays is longer than in the case of direct lighting; due to the frequently multiple reflection of the rays, the proportion of scattered rays is increased, thus creating optimum uniformity of radiation distribution; there is no direct reflection of the radiation in the direction of the optical system, for example, through the glass plate of the copyholder. Further, it is an essential advantage of the apparatus according to the invention that it may be operated as a daylight apparatus, independently from outside light conditions and light influences. As a consequence of the different factors listed above, the edges of the original can be lighted substantially without the formation of shadows.

For purposes of projecting an exact image of the original in whatever scale of representation is desired onto the printing master, the original which is to be copied must be securely arranged in the apparatus. Accordingly, a copyholder is provided preferably in an area easily accessible on the apparatus. In a preferred embodiment of the present invention a drop door is provided which when opened exposes a sealed glass cover communicating with a means for holding the original in place, such as a reduced pressure at the glass plate produced by a vacuum pump arrangement. For ease of insertion of the original into the holder therefor the drop door may be provided with a means for holding the door in a preselected position, such as a cylindrical damper or the like.

While the original is held in a fixed position in the apparatus for illumination and subsequent imaging, the arrangement for the indirect illumination may comprise radiation sources arranged generally in the shape of the original and at a distance which corresponds approximately to the depth of the illumination device. The illumination device may, of course, be any specific size and shape of suitable dimensions providing that the illumination of the original is only by indirect radiation.

The apparatus according to the present invention is arranged with suitable control means for operating the carriage vacuum system, charging device, lighting device, transportation and drying means and the like. Preferably, the entire procedure of manufacturing of printing masters is carried out completely automatic by the appropriate arrangement of the control means.

For projecting the image onto the printing masters, any of the various known optical arrangements may be employed as desired. In a preferred embodiment, an optical system is provided having a bellows extending from the lighting device and containing at the end opposite the lighting device a diaphragm and shutter which are in turn supported on a rotatable spindle. By operation of the spindle the optical system can project the image in an enlarged or reduced manner onto the printing master. The compactness of the system can be arranged with the use of suitable reflectors to provide the desired projection distances of varying lengths within parameters determined by the overall design of the apparatus.

Similarly, the transportation system for developing, fixing, drying and discharging of the exposed printing masters may be conventional conveyors or the like. In a preferred embodiment the carriage mechanism also provides pins capable of guiding the trailing edge of the exposed printing master off the vacuum plate and onto a conveyor belt communicating with the developing apparatus.

The invention has the further advantages that individual printing masters may automatically be removed from a supply stack, that a contact between the light-sensitive layer of the printing master and means of transportation, such as rollers, is impossible, and that the original may be lighted and illuminated substantially without the formation of shadows, so that high quality printing forms are obtained which are free from irregulatities.

BRIEF DESCRIPTION OF THE DRAWINGS

In the following, the invention will be explained in more detail by reference to the embodiments shown in the drawings.

In the drawings.

DESCRIPTION OF THE PREFERRED EMBODIMENTS

Figure 1:
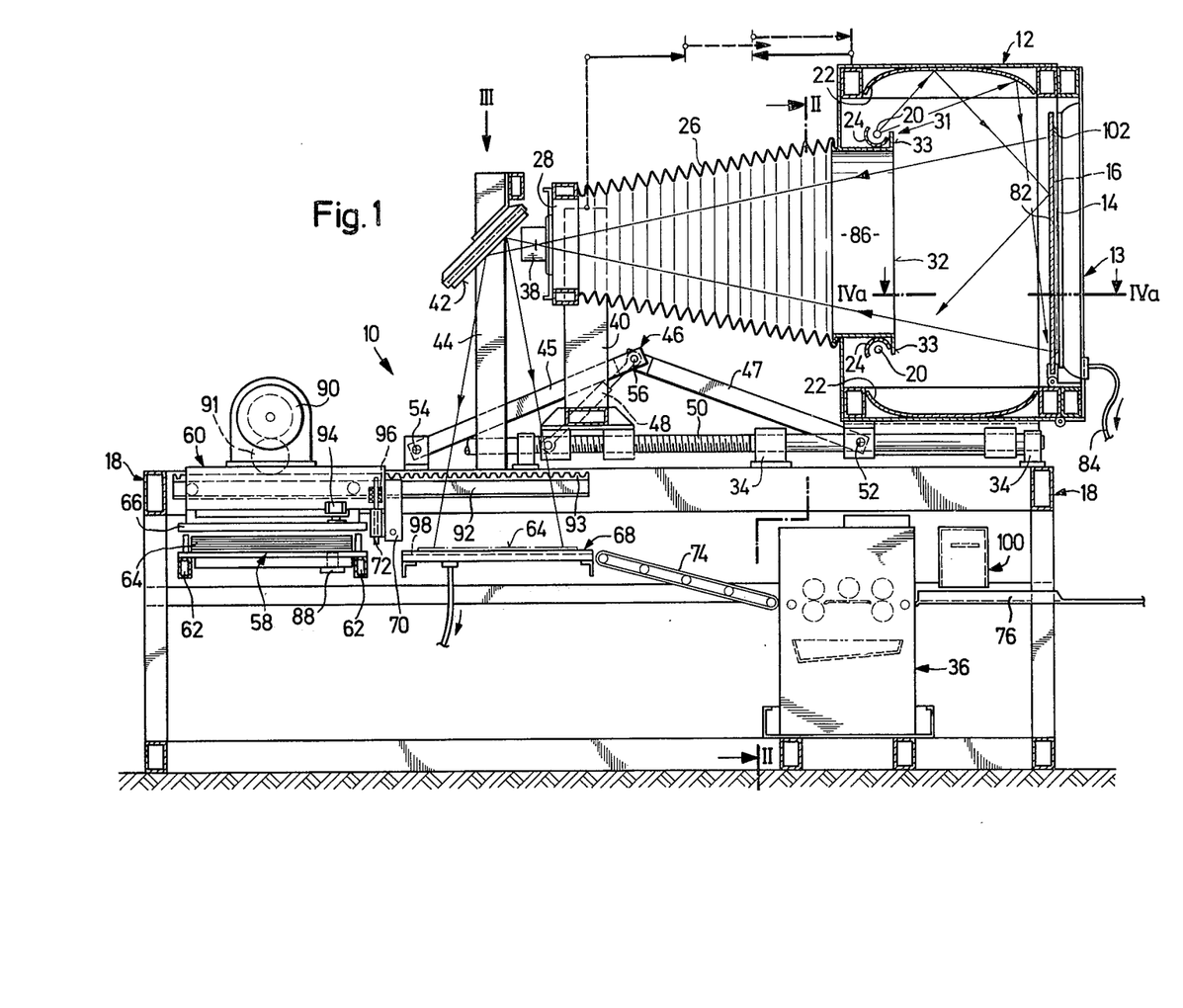
FIG. 1 is a sectional view of the apparatus according to the invention.
Figure 2:
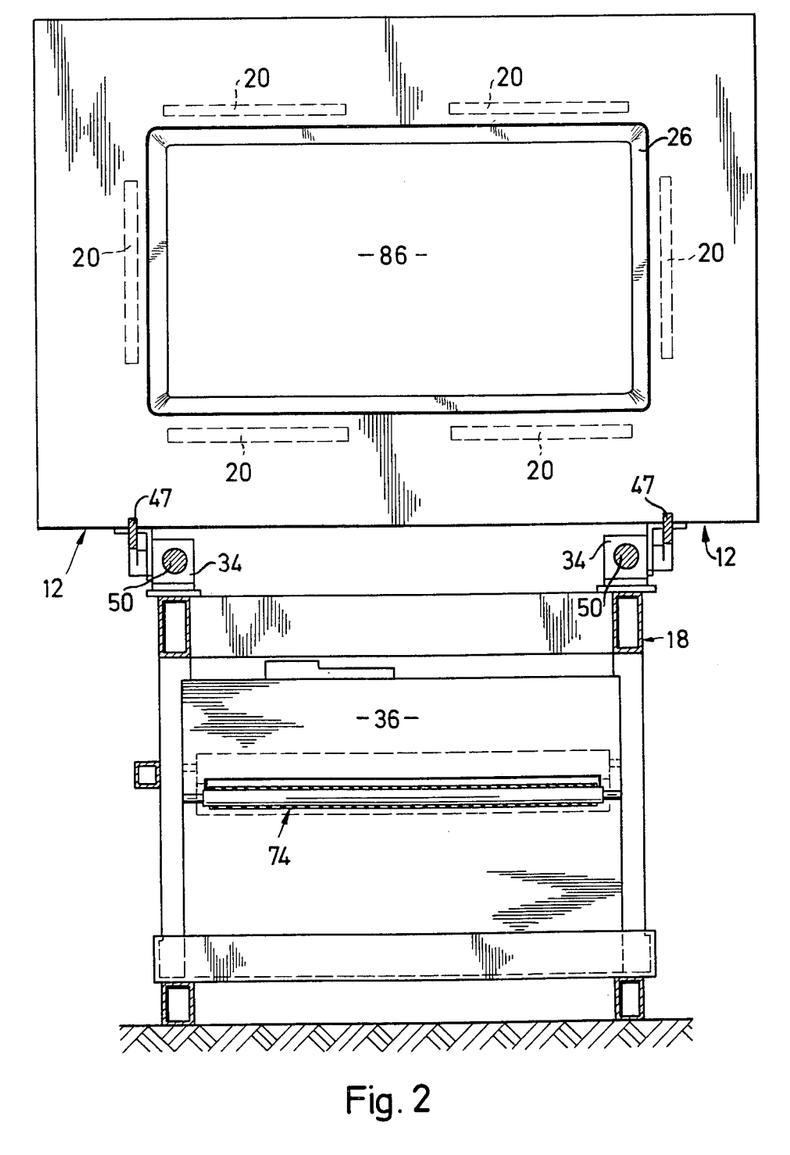
FIG. 2 is a section along the line II—II of FIG. 1.

The apparatus shown in FIG. 1 and designated as No. 10 comprises a lighting device 12 and an imaging device consisting of an optical system 38 provided with a diaphragm, a shutter 28, and a mirror 42, all arranged above a frame 18, and further comprises a feed mechanism with a carriage 60 which in the rest position is arranged above a plate holder 58, a charging station 70, an exposure platform 68, and a developing station 36 with a drying station 100 adjacent to it.

Figure 4A:
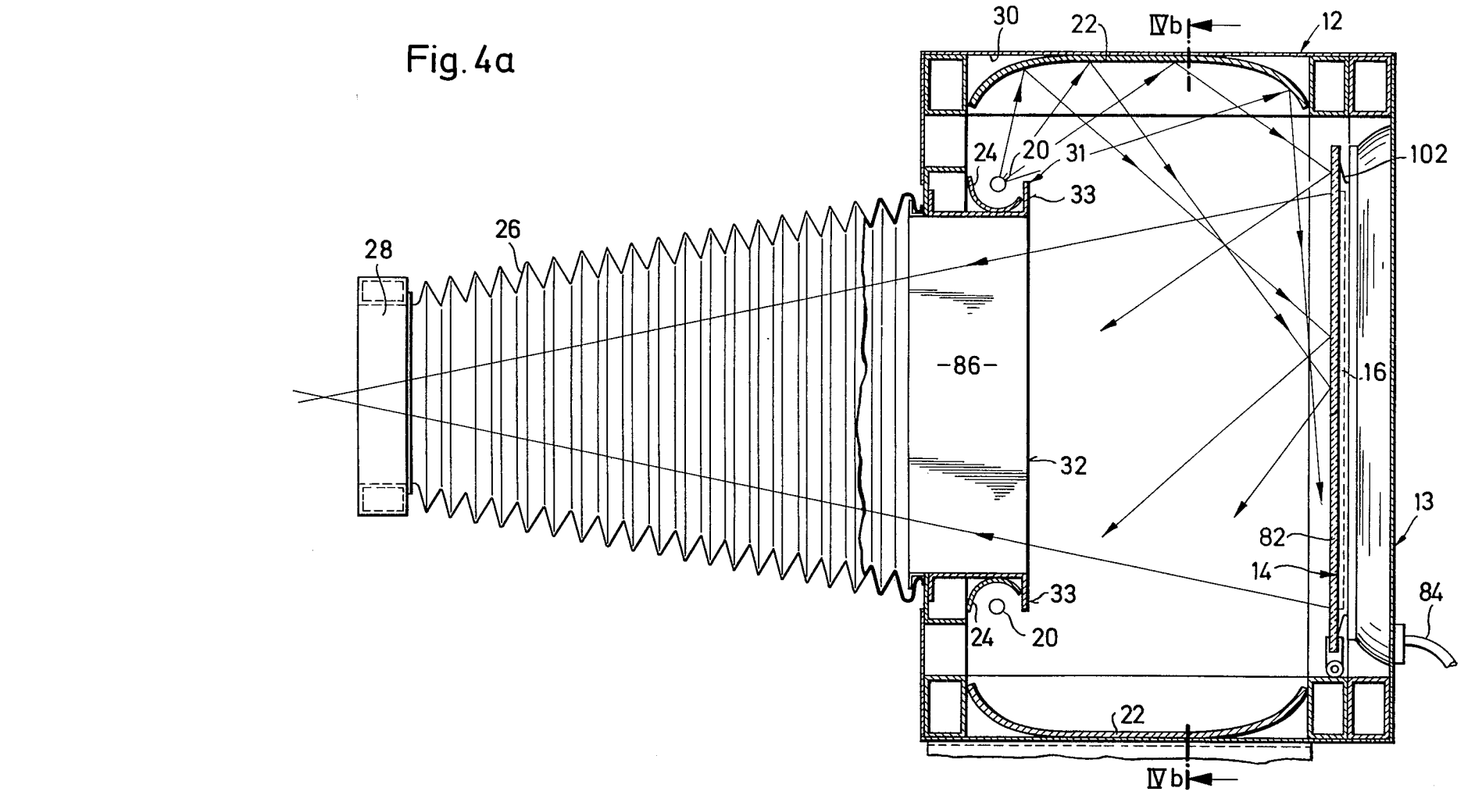
FIG. 4a is a horizontal sectional view of the lighting device of the apparatus, seen along the line IVa—IVa of FIG. 1.
Figure 4B:
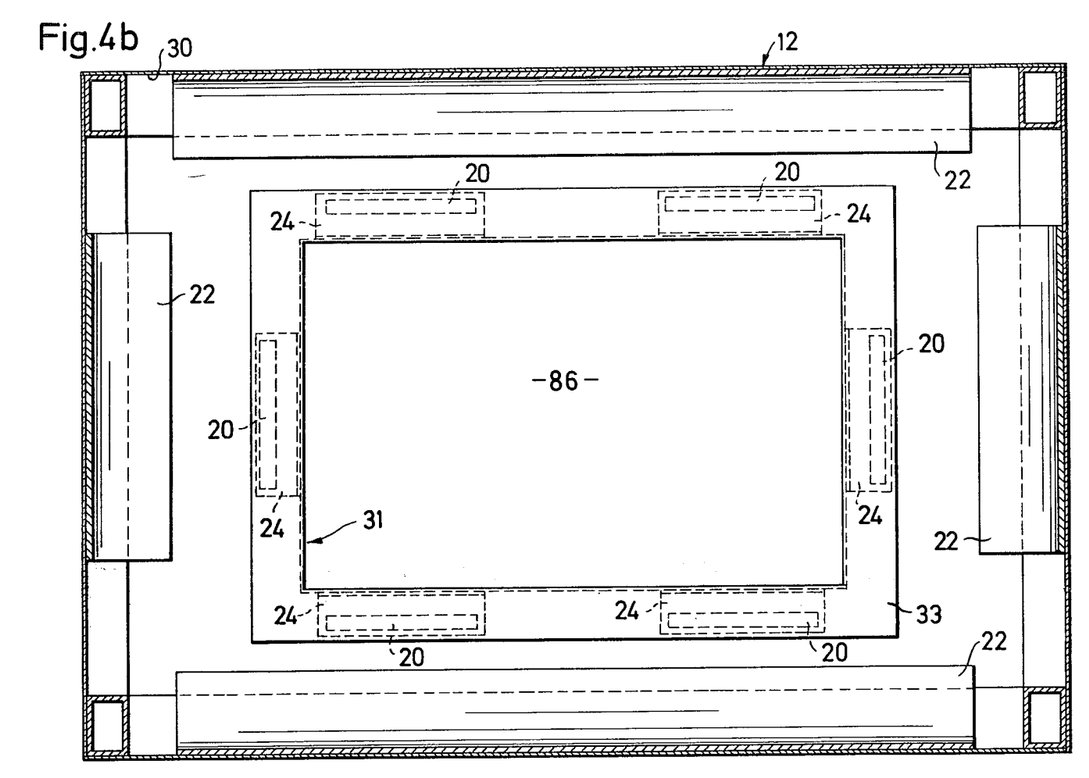
FIG. 4b is a sectional view of the lighting device, seen along the line IVb—IVb of FIG. 4a, FIG. 5 is a perspective view of the drop door of the lighting device and of the copyholder.
Figure 5:
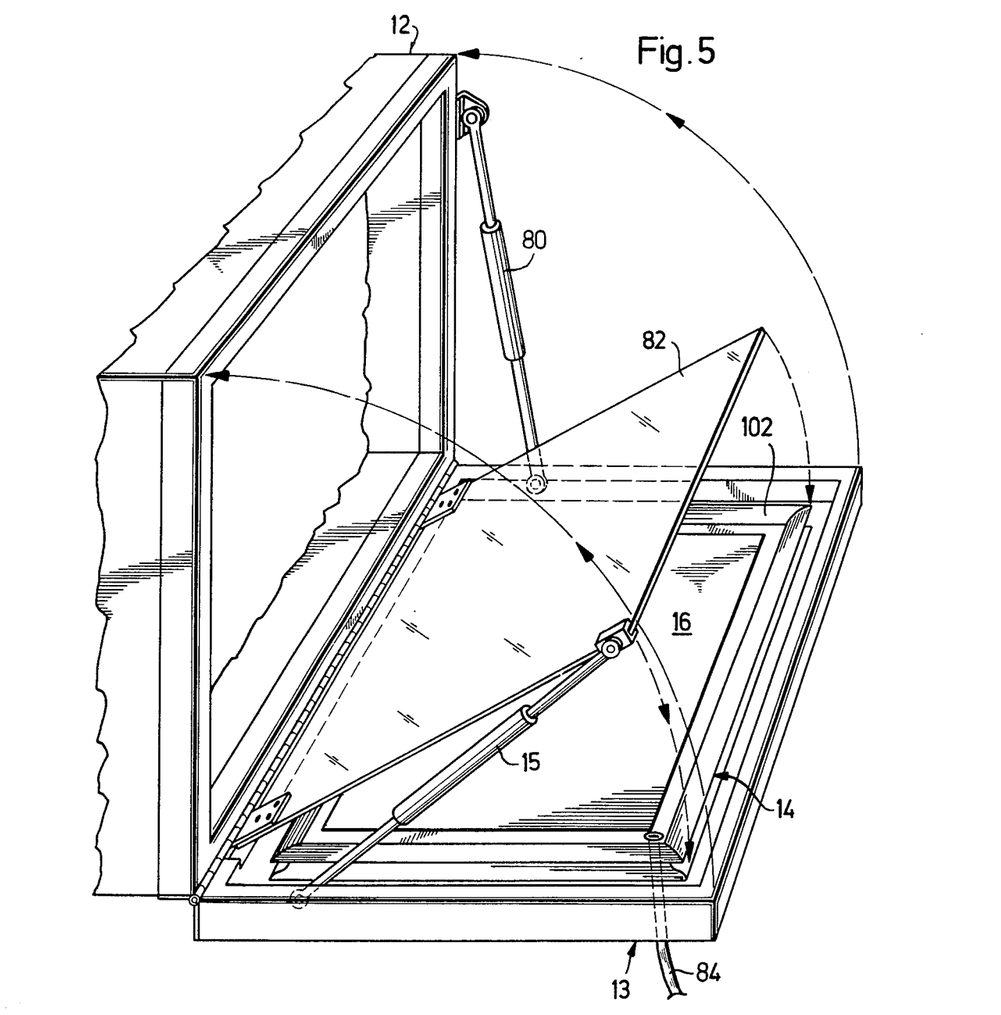

A copyholder 14 to accommodate the original for copying purposes is arranged at the back of the drop door 13 of the lighting device 12. If desired, the copyholder 14 may be provided with a suction device and connected to a vacuum pump (not shown) by a duct 84. To ensure that the original 16 assumes a planar position when it is pressed upon the surface of the copyholder 14, a glass cover 82 is provided which rests on a gasket ring surrounding the surface of the copyholder. The opened glass cover 82 is propped against the drop door 13 by a cylindrical damper (see FIG. 5), thus ensuring that the opened glass cover 82 remains in any set position so that the original 16 may be placed in the copyholder 14 without hindrance. The drop door 13 is connected to the casing of the lighting device 12 by a further cylindrical damper 80 which assists the manual closing and opening of the drop door 13. In the interior of the lighting device 12, near its back wall, radiation sources 20 are arranged by means of which the original is lighted. The radiation sources, for example, burners, are closely surrounded by reflectors 24 which direct the incident radiation in the direction of further reflectors 22 from where it is reflected at a definite angle onto the original 16 held in the copyholder 14. By reflecting the radiation by reflectors 24 and 22 and by screening it by a screen 32, an undesirable direct lighting of the original is avoided. If an original is directly lighted, i.e., without previous reflection of the radiation, shadows are formed on the original 16. The side walls 30 of the lighting device 12 are reflecting, so that they also direct the incident radiation onto the original 16 positioned in the copyholder 14 at a certain, preferably acute, angle to the surface of the original. The screen 32 shields the radiation sources 20 from the original 16 in such a manner that direct illumination of the original 16 by the radiation sources 20 and direct reflection to the optical system 38 are avoided. The screen 32 consists of an attachment 31 which surrounds the entrance of the bellows 26 at the rear end of the lighting device 12. The attachment 31 has a rectangular cross-sectional area and a border strip 33 which protrudes at right angles to the attachment and parallel to the surface of the copyholder 14. The radiation sources 20, of which two may be arranged in line with each of the longer edges of the original 16 and one at each shorter edge, surround the original 16 symmetrically to its center axis, as can be seen from FIG. 4b, and are arranged at a distance from the copyholder 14 which is slightly less than the depth of the lighting device 12. At the other end of the bellows 26 opposite to the entrance 86, the bellows is closed by the optical system 38 which is operated by the shutter 28. The optical system 38 may be provided with an optical distorting device (not shown), for example, a shrinking lens, to cause an unidirectional linear change of the scale of reproduction. The lens may be pivoted before the optical system 38, when desired, but is not normally positioned within the path of rays of the optical system 38. The bellows 26 together with the diaphragm and the optical system 38 is connected with a first bracket 40 which may be moved along a spindle 50. The spindle 50 is supported by guide means 34 and rests on the frame 18. The mirror 42 which serves to re-direct the rays reflected by the lighted original 16 and striking upon the mirror after passing through the bellows 26, the diaphragm and the optical system 38, is located in the upper portion of a second, stationary bracket 44, at the level of the optical system 38. The mirror is inclined at an angle to the horizontal, for example at an angle of 45°.

Figure 3:
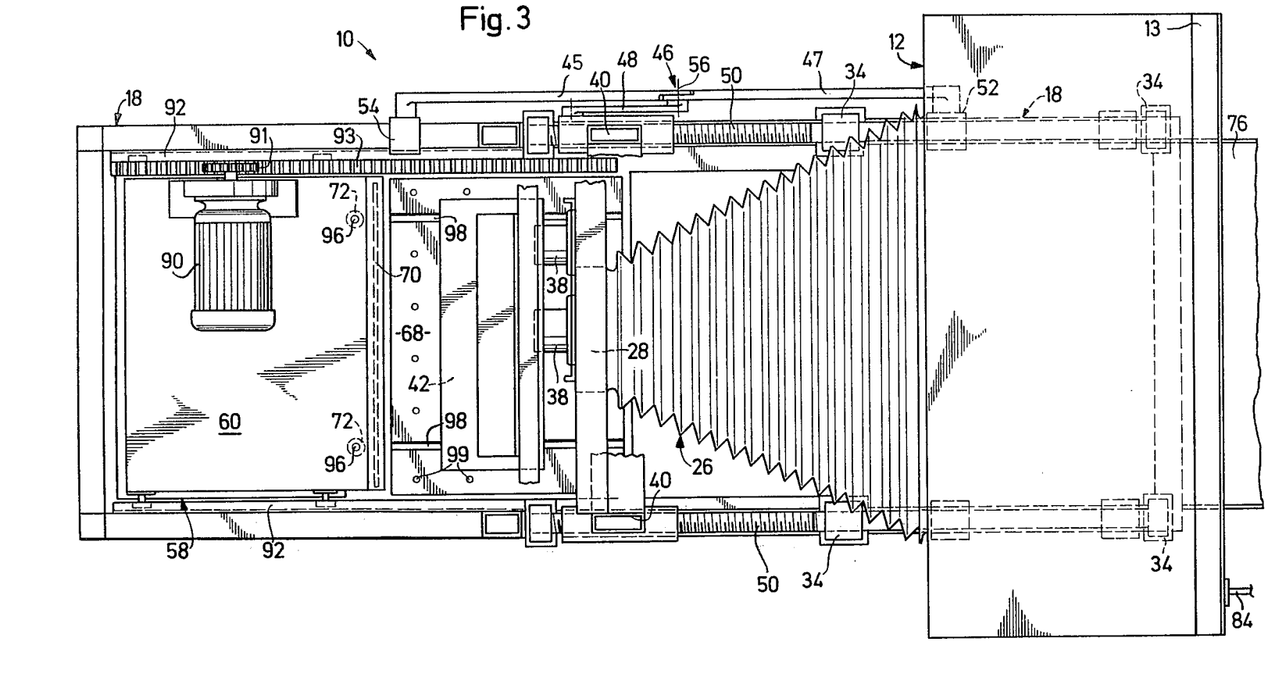
FIG. 3 is a plan view of the apparatus shown in FIG. 1, seen in the direction of the arrow III.

The imaging device is displaced by means of a toggle lever drive 46 which comprises two levers 45 and 47. The first lever 45 is mounted in a stationary bearing 54 and rests on the frame 18, whereas the second lever, 47, is pivoted in a pivot bearing 52 at the back of the lighting device 12. Together with the spindle 50, the two levers 45 and 47 of the toggle lever drive 46 form a collapsible triangle. The two levers 45 and 47 are engaged, in their pivotal point 56, by a further lever 48. In the embodiment of the invention shown in FIGS. 1 and 3, the toggle lever drive 46 is arranged at right angles to the horizontal and parallel to the drawing plane. It goes without saying that the toggle lever drive may, alternatively, be arranged horizontally, in a horizontal plane which is at right angles to the drawing plane, or may be swivelled through 180°, as compared with the position shown in FIG. 1, and extend downwardly, so that the pivotal point 56 is then positioned below the spindle 50. The spindle 50 supported in the guide means 34 is driven by a motor (not shown). The lever 48 may be adjusted to a fixed length so that, in accordance with the adjusted length, different relative velocities are produced in the to and fro motion of the lighting device 12 and the bracket 40. If, in the arrangement of the levers 45, 47, and 48 shown in FIG. 1, the bracket 40 is moved by the rotation of the spindle in a known manner, such as by a motor or manual crank, to the right-hand side, in the direction of the lighting device 12, the lighting device 12 simultaneously moves in the opposite direction of the bracket 40. As soon as the lever 48 has passed its vertical position in the course of this motion, the direction of movement of the lighting device 12 is reversed and the lighting device moves in the same direction as the bracket 40, i.e., to the right hand side.

An enlargement or reduction of the image of the original 16 projected upon the printing plate 64 is produced by an appropriate displacement of the bracket 40. If the scale of reproduction is to be reduced or enlarged, either in one direction only or in the longitudinal and the transverse direction of the original 15, an appropriate optical distorting device, for example, a shrinking lens, is added to the optical system 38. The optical system 38 and the shrinking lens are known devices so that a detailed description thereof can be omitted.

The printing plates 64 are stacked in a plate holder 58 arranged below the frame 18, to one side of the rear end of the apparatus 10. Preferably, the plate holder 58 is in the form of a drawer which can be withdrawn and is provided with a limit switch 88 which blocks the automatic starter initiating the movement of the carriage 60 feeding the printing plates 64 when the plate holder 58 is empty. Laterally from the plate holder 58, guides 62 are provided along which the plate holder 58 may be moved.

The carriage 60 is driven by a motor 90, through a gear 91 and a rack-and-pinion gear 93, for example, and may be displaced in the direction of the exposure platform in the guide rails 92. A switch 94 is attached to the lower side of the carriage 60, by which the charging station 70, consisting essentially of a corona, is switched on and off during the movement of the carriage 60.

The carriage 60 has a vacuum plate 66 attached to its underside, which is connected by a number of openings with a vacuum pump (not shown). When the carriage 60 touches the upper surface of the plate holder 58, a reduced pressure is created by the vacuum plate 66, by which the uppermost printing plate 64 is sucked to the vacuum plate 66. The exposure platform 68 is likewise provided with a number of holes 99 connected to the vacuum pump (not shown). By creating an appropriate reduced pressure in the ducts of the exposure platform 68, the printing plate 64 deposited by the carriage 60 is urged against the exposure platform 68 and maintained in this position.

Figures 6A, 6B:
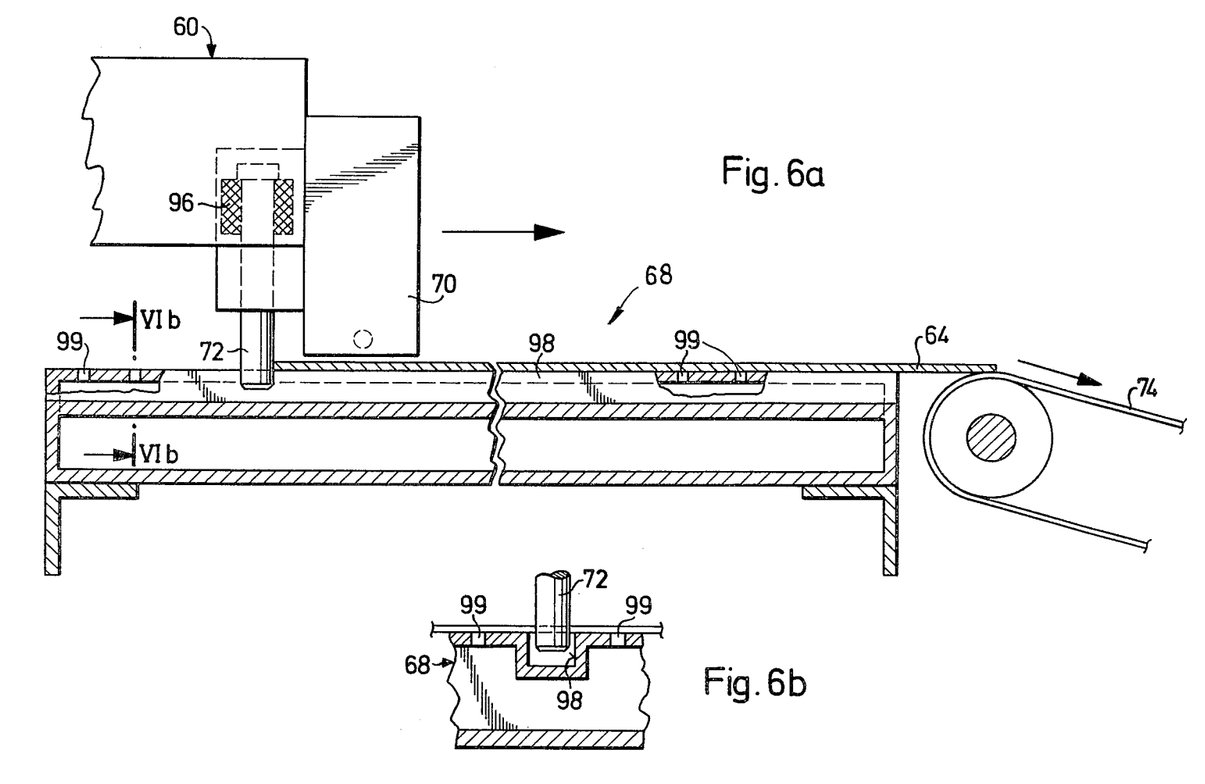
FIG. 6a is an enlarged side view of the lighting device during the delivery of a printing plate.
FIG. 6b is a sectional view taken along the line VIb—VIb of FIG. 6a and showing a detail of said figure.

As can be seen from FIGS. 6a and 6b, the exposure platform 68 may comprise an ejector mechanism for the exposed printing plate 64, which comprises two grooves 98 extending in the longitudinal direction of the apparatus 10. The grooves 98 are engaged by pins 72 lowered into them when the carriage 60 moves over the exposure platform 68. Two or more pins 72 may be arranged at the front end of the carriage 60 and their height may be adjusted by means of electro-magnetic coils 96. Next to the exposure platform 68, there is a conveyor belt 74 which may be slightly inclined with respect to the horizontal in order to shorten the length of the machine. The conveyor belt 74 is used for putting the printing plates down, in order to accelerate the course of operations, and at the same time it is used as a means of transportation for the exposed printing plates 64 which are conveyed by the conveyor belt 74 to the developing station 36, from there to the drying station 100, and finally to the discharge station 76 at the outside of the apparatus 10.

The apparatus is operated as follows:

First, the drop of the apparatus is opened, the glass cover 82 of the copyholder 14 is lifted and remains in this position by the cylindrical damper 15, and the original 16 is placed in the copyholder 14. As soon as the drop door 13 has been closed and the apparatus 10 has been switched on, the carriage 60 removes one of the printing plates 64 stacked in the plateholder 58 by sucking it, by reduced pressure, to the vacuum plate 66 provided on the underside of the carriage 60. The carriage 60 with the printing plate 64 sucked to it is then slightly lifted from the upper surface of the plateholder 58 and moved in the direction of the exposure platform 68 by means of motor 90. As soon as it has reached its position above the exposure platform 68, the carriage 60 is lowered onto the platform and the reduced pressure created in the vacuum plate 66 is interrupted, so that the printing plate 64 is released and deposited on the exposure platform 68. As already mentioned, the exposure platform 68 is also provided with reduced pressure, so that the printing plate 64 is firmly urged against the exposure platform 68. Thereafter, the carriage 60 returns to its initial position above the plateholder 58. During the return movement, the vacuum plate 66 of the carriage actuates a switch 94 by which the charging station 70 is switched on and the printing plate 64 positioned on the exposure platform 68 is electrostatically charged while the carriage returns to its initial position. After the return of the carriage 60 to its initial position above the plate holder 58, the charging station 70 is switched off and the printing plate 64 is exposed. For this purpose, the original 16 clamped in the copyholder 14 is indirectly lighted within the lighting device 12 by the radiation sources 20 which are screened from the original 16 by the screen 32 to avoid direct illumination and direct reflection. By means of the imaging device 28, 38, 42, which may comprise a known distorting device to change the scale of reproduction in one direction, the original 16 lighted without the formation of shadows is projected onto the printing plate 64. After exposure of the printing plate 64, the carriage 60 leaves its initial position again and, at the same time, the pins 72 arranged at the front end of the carriage 60 are lowered by means of electromagnetic coils 96 and engage the longitudinal grooves 98 in the exposure platform 68. In their lower position, the pins 72 touch the trailing edge of the printing plate 64 and push it upon the conveyor belt 74 during the movement of the carriage 60. The conveyor belt 74 transports the exposed printing plate carrying a latent electrostatic image of the original on its upper surface to the developing station 36. In the developing station, development and fixation of the latent electrostatic image on the printing plate 64 are performed in known manner. After leaving the developing station 36, the printing plate 64 passes through the drying station 100, which may be equipped, for example, with infrared radiators to dry the developed image, and then passes through a slot to the discharge station 76 at the outside of the apparatus 10.

Owing to the fact that only the insertion of the original 16 into the copyholder 14 and the stacking of the printing plates 64 in the plateholder 58 are done by hand, whereas all other operations in connection with the indirect lighting of the original, the exposure of the printing plate, and the development and fixing of the latent electrostatic image produced on the printing plate are automatically performed and a mechanical contact between the surface of the printing plate and rollers or the like is substantially avoided by the use of reduced pressure, technically unobjectionable printing plates of high quality can be produced.

What is claimed is:

1. An apparatus for the manufacture of printing masters by electrophotographic means comprising:
   a frame supporting an unexposed printing master holder and carriage means for removal of unexposed printing master from said holder by reduced pressure of a vacuum plate;
   an exposure platform communicating with said frame to receive said unexposed printing master from said carriage means and securely retain said printing master during charging and exposure thereof;
   charging means communicating with said frame for electrostatic charging of said printing master retained to said exposure platform;
   means communicating with said frame for holding an image containing original for illumination and projection onto said printing master;
   means communicating with said frame for illumination of said original by radiation sources capable of only indirect illumination of said original;
   means communicating with said illumination means for projection of image of said original onto said charged printing master; and
   means communicating with said frame for transportation, developing and drying of said printing master after exposure of said printing master to said projected image.

2. The apparatus according to claim 1, whereby said carriage runs on two guide rails and is driven by a motor mounted on its upper side, said motor being geared, over a gear, to a rack-and-pinion gear arranged parallel to the direction of movement of the carriage.

3. The apparatus according to claim 2, whereby after removing said printing plate from said plate holder, said carriage may be displaced from its position above said plate holder in the direction of said exposure platform; whereby, after depositing said printing plate on said exposure platform, said vacuum plate of said carriage switches on said charging means; whereby said carriage then returns to its initial position and switches off said charging means.

4. The apparatus according to claim 3, wherein said charging means is arranged at the front end of said carriage and extends over its longitudinal edge.

5. The apparatus according to claim 1, wherein said printing master is a printing plate.

6. The apparatus according to claim 5, whereby said plateholder is constructed as a withdrawable drawer equipped with a limit switch which blocks an automatic starter for the feed of said printing plate when said plateholder is empty.

7. The apparatus according to claim 5, wherein on the front end of said carriage, two or more pins are arranged which may be lowered by means of electromagnetic coils after termination of said exposure.

8. The apparatus according to claim 7, wherein grooves are provided in said exposure platform which extend in the direction of movement of said carriage and are engaged by said lowered pins during the movement of said carriage over said exposure platform.

9. The apparatus of claim 8, whereby after exposure of said printing plate, said carriage leaves its initial position and during this movement, said pins rest against the trailing edge of said printing plate and push said plate over a conveyor belt into a developing means and an adjacent drying means.

10. The apparatus according to claim 5, wherein said projection means comprises a movable optical system for selective variation of the scale of reproduction of said image.

11. The apparatus of claim 10, wherein said movable optical system comprises a toggle lever drive communicating with a bracket movable along a spindle and carrying a diaphragm and a shutter.

12. The apparatus of claim 11, wherein said toggle lever drive comprises two levers supported in a pivot bearing on said housing and stationary bearing on said frame.

13. The apparatus according to claim 12, wherein said two levers of said toggle lever drive are engaged in their pivotal point by a third lever whose length may be fixedly adjusted and the other end of which is attached to the foot of said movable bracket carrying said optical system.

14. The apparatus according to claim 10, wherein said radiation sources are separated from said original by a radiation screen.

15. The apparatus according to claim 14, wherein said illumination means comprises first and second reflectors which partially surround said radiation sources and are arranged between said screen and said radiation sources in such a manner that they direct the radiation received from said radiation sources onto said original by indirect reflection.

16. The apparatus according to claim 15, wherein each of said radiation sources is surrounded by a first, curved reflector which is positioned at a distance of not more than 3 cm from the surface of said radiation source and is open in the direction of longitudinal side walls of a housing of the illumination means.

17. The apparatus according to claim 16, wherein the planar sections of said second reflector are attached to said side walls and that said curved sections extend in the direction of said radiation sources.

18. The apparatus according to claim 17, wherein said side walls are reflecting and direct the incident radiation onto said original at an acute angle to the surface of said original.

19. The apparatus according to claim 18, wherein said radiation sources surround said original symmetrically to its edges and at a distance which is slightly less than the depth of said housing.

20. The apparatus according to claim 19, wherein said screen comprises an attachment which surrounds the entrance opening of a bellows at the wall of said housing opposite said original and having a rectangular cross-sectional area with a border strip arranged at right angles thereto, to avoid direct radiation of the said radiation sources in the direction of said original.

21. The apparatus according to claim 18, wherein said holder of said original is arranged at the back of said housing against a sealed glass cover communicating with a vacuum pump.

22. The apparatus according to claim 21, wherein a drop door communicates with said housing providing access to said glass cover.

23. The apparatus according to claim 22, wherein said drop door connects with said glass cover by way of cylindrical damper.

24. An electrophotographic method for the manufacture of printing masters comprising:
arranging an image containing original in a holder, mechanically transferring an unexposed printing master by reduced pressure from a printing master holder to an exposure platform, electrostatically charging said unexposed printing master, exposing said printing master to said image of said original projected through a movable optical system by way of an indirect illumination of said original, mechanically transferring said exposed printing master to a developing device, developing and fixing the latent electrostatic image on said printing master, mechanically transferring said developed printing master to a drying device, and drying said developed printing master.

* * * * *

UNITED STATES PATENT OFFICE
CERTIFICATE OF CORRECTION

Patent No. 4,006,984  Dated February 8, 1977

Inventor(s) Ferdinand Friese

It is certified that error appears in the above-identified patent and that said Letters Patent are hereby corrected as shown below:

Column 1, line 31 change "emmersion" to --immersion--.

Column 6, line 41 change "15" to --16--.

Signed and Sealed this twenty-third Day of August 1977

[SEAL]

Attest:

RUTH C. MASON
Attesting Officer

C. MARSHALL DANN
Commissioner of Patents and Trademarks